(12) United States Patent
Murphy

(10) Patent No.: US 7,273,984 B2
(45) Date of Patent: Sep. 25, 2007

(54) OUTDOOR CORD CONNECTION COVER APPARATUS

(75) Inventor: Kevin Murphy, Babylon, NY (US)

(73) Assignee: Twins Investments Company, Babylon, NY (US)

( * ) Notice: Subject to any disclaimer, the term of this patent is extended or adjusted under 35 U.S.C. 154(b) by 0 days.

(21) Appl. No.: 11/484,258

(22) Filed: Jul. 11, 2006

(65) Prior Publication Data

US 2007/0007030 A1   Jan. 11, 2007

Related U.S. Application Data

(60) Provisional application No. 60/698,258, filed on Jul. 11, 2005.

(51) Int. Cl.
*H02G 15/08* (2006.01)

(52) U.S. Cl. ............................................... 174/92
(58) Field of Classification Search ............... 174/92, 174/138 F
See application file for complete search history.

(56) References Cited

U.S. PATENT DOCUMENTS

| 3,144,506 | A | * | 8/1964 | Gunthel, Jr. | 174/71 R |
| 3,715,459 | A | * | 2/1973 | Hoffman | 174/138 F |
| 3,716,815 | A | * | 2/1973 | Riches | 439/142 |
| 4,935,582 | A | * | 6/1990 | Calligaris | 174/92 |
| 5,099,088 | A | * | 3/1992 | Usami et al. | 174/76 |
| 2005/0167147 | A1 | * | 8/2005 | Marsac et al. | 174/92 |

* cited by examiner

*Primary Examiner*—Chau N. Nguyen
(74) *Attorney, Agent, or Firm*—William B. Ritchie

(57) ABSTRACT

The invention is an outdoor electrical cord connection protector. A pair of mated covers is at least partially hinged along a common access. Each mated cover provides a snap together wire entrance at one end and a wire exit at the other end of the snap together covers. Each wire entrance and wire exit opens to a snap together plug opening adapted to hold at least two mated plugs of an outdoor string of decorative lights. A seal can be affixed to each of the entrances of the protector. The seals help keep the protector water tight and well as protect against other environmental hazards such as dirt, bugs, etc.

4 Claims, 5 Drawing Sheets

OUTDOOR CORD CONNECTION COVER APPARATUS

This application claims benefit of priority under 35 U.S.C. §119(e) to U.S. Provisional Application Ser. No. 60/698,258 filed Jul. 11, 2005.

FIELD OF THE INVENTION

This invention relates to outdoor decorative lighting, in particular, covers for protecting multiple cords that are connected together.

BACKGROUND OF THE INVENTION

Outdoor lighting has become extremely popular over the last decade. Initially, such lighting strings were used primarily indoors for decorating Christmas trees. Eventually, such lighting was moved outdoors as well, to decorate the house, exterior buildings, shrubs or adjacent trees. Now, the popularity of this type of lighting has extended to other holidays as well such as Halloween, special occasions, parties and so on. Some people use this type of lighting decoration year round.

The typical outdoor lighting string has a plurality of miniature bulbs, usually about 100 bulbs per string. When one bulb burns out, the others will remain lighted. The strings are made up of two strands of green wire so that the lighting will blend in with the environment. The strings are usually about 25 feet long with plugs on both ends so that more strings can be attached. Manufacturer's instructions require that no more than four strings are to be connected together. Also, a visual detectable fuse is included in one plug end so that if amperage usage exceeds specifications, the fuse of the string that has blown can easily be determined.

To prevent the connection between string plugs from getting wet and causing short circuits, electrical or duct tape is frequently used to wrap the joined plugs. In addition to the inconvenience of such methods, the color of the tape causes the taped connectors to be readily visible rather than blend in as the green wire does. Further, by wrapping the connection in tape, viewing the status of the fuse in the plug is not possible without removing the tape, changing a blown fuse, and then re-taping.

Several manufacturers provide a device for keeping connected cords from getting wet. Once such device, made for extension cords, requires the mating halves to be snapped over each other and then screwed together to cover the cord connections. This device will not work for outdoor lighting strings due to the fact that two wires of smaller gauge are used in outdoor lighting strings and a single wire of much larger gauge is used in extension cords. Further, once this device is locked into place, viewing the status of the fuse in the plug is impossible since the device is opaque. Further, once in position, it cannot be easily removed thus making changing fuses, if necessary, extremely difficult.

Another device, PROTECT-A-CORD, is designed to connect a tool power cord to an extension cord. In this device, opposing hinged halves are said to snap together around the connection and the cords to prevent accidental uncoupling. This device makes no claim for water proofing and the device is opaque, again, rendering it unsuitable for outdoor lighting use.

Still another extension cord device features rectangular hinged halves which are placed around the connection plugs and cords to prevent accidental uncoupling. As found with the above referenced device, no claim is made regarding the prevention of water from entering inside the cover and it, too, is opaque. Again, this destroys the suitability for outdoor lighting string connection use.

A low cost, outdoor cord connection cover apparatus that is transparent so that the status of the fuse present in the plug can be easily viewed; features hinged halves that can be easily snapped firmly together to house either two, three or four plugs; and that provides a water resistant seal that will surround the thin gauge wires of the lighting string are not found in the prior art.

SUMMARY OF THE INVENTION

The invention is an outdoor cord connection cover apparatus that is specifically designed to accommodate the connection of one or more outdoor lighting strings such as used in Christmas displays or other decorative occasions. The apparatus is made from a single sheet of transparent plastic that is molded to provide two mate-able halves connected by a flexible joint. One half has a length of a U-shaped projection that is dimensional to snap into a corresponding length of a U-shaped slot in the other half, wherein the cover is held firmly together. The wires exit from the ends of the mated covers via semi-circular channels which are lined with a material that seals the wires against water leakage to the plugs which could cause a short circuit. A fuse in the lighting plug is easily viewed through either cover half. The cover can be made to hold either two or up to four plugs which is the maximum number that should be connected together in accordance with manufacturer's specifications.

It is an aspect of the invention to provide an outdoor cord cover connection apparatus that can be easily fabricated from transparent plastic using molding techniques well known in the art.

Another aspect of the invention is to provide an outdoor cord cover connection apparatus that is a single integral member so that parts cannot be lost rendering the apparatus useless.

Still, another aspect of the invention is to provide an outdoor cord cover connection apparatus that has a seal adapted to fit around multiple small gauge wires that are used with outdoor lighting so that water will be prevented from reaching the connected plugs.

Finally, it is an aspect of the invention to provide an outdoor cord cover connection apparatus that is unobtrusive and easily blends into the environment so that a viewer is no more aware of the connected plugs with the invention in place as the viewer would be when the invention is not in place.

DESCRIPTION OF THE EMBODIMENTS

Figure 1:
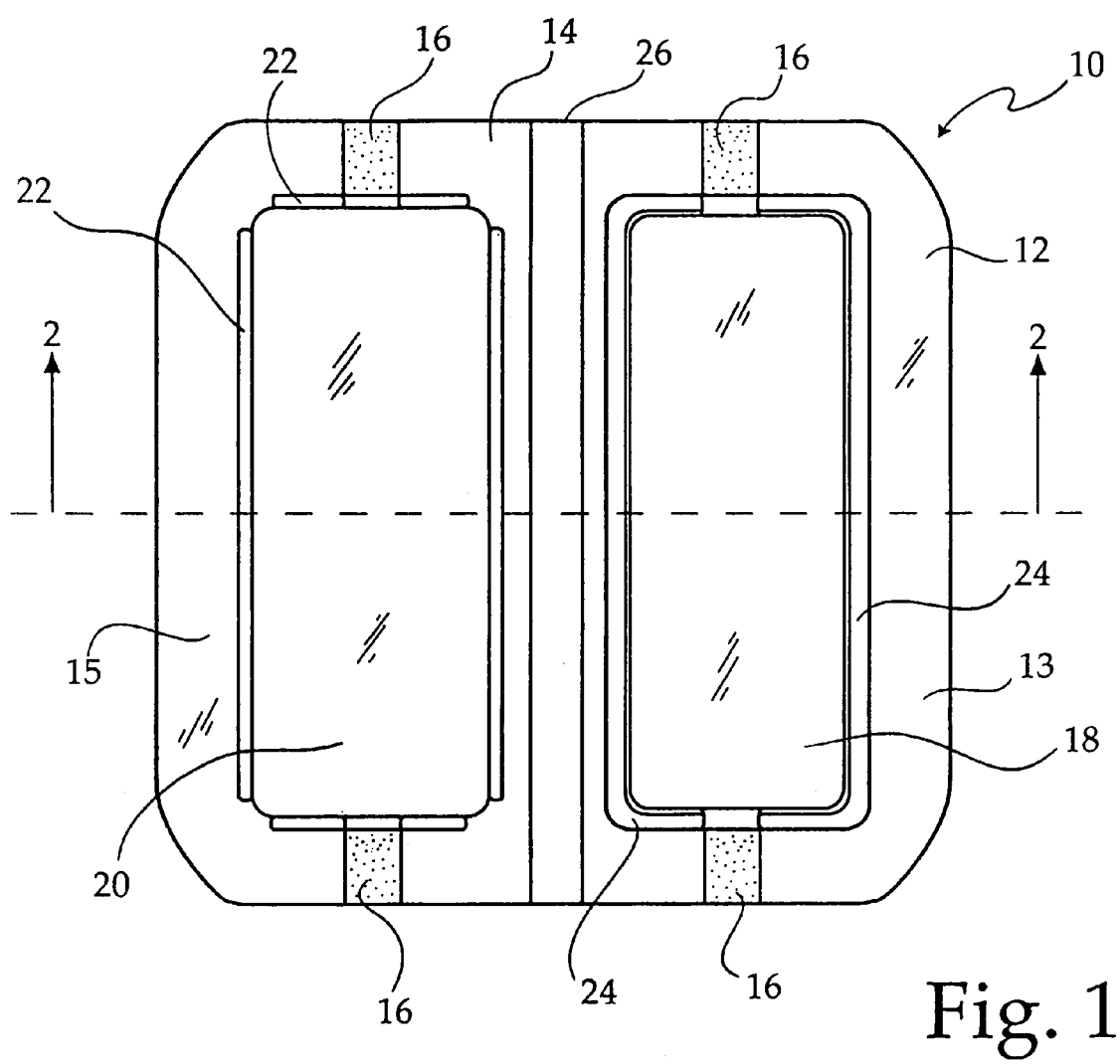
FIG. 1 is a top view of the outdoor cord cover connection apparatus in an open position and in accordance with the invention.

Referring now to FIG. 1, a top view of the outdoor cord cover connection apparatus 10 is made from a single sheet of transparent plastic by vacuum forming the desired shape in a mold or other suitable method of plastic fabrication also well known in the art. The sheet, preferably about 20 thousandths of an inch thick, can be any transparent plastic that is easily formed using standard methods while maintaining dimensional stability and also capable of withstanding the expected environmental conditions such as sub freezing temperatures, snow and rain, as well as hot weather conditions.

"Invention 10 is shown in an open position. Top half 14 is integrally connected to bottom half 12 via hinge 26. Each half has a pocket 20, 18 respectively, in which the plugs of two outdoor lighting strings are attached together and placed therein (See FIG. 5). In order to hold securely but releasably fasten top half 14 to bottom half 12, a circumferential U-shaped projection is provided in top half 14 which is aligned to fit within a circumferential U-shaped slot in bottom half 12. The wires from the plugs exit semi-circular openings 16 which are explained in greater detail below. In order to snap the invention closed, a user merely rotates flange 13 toward flange 15 until the projection is snug within its corresponding slot."

Figure 2:
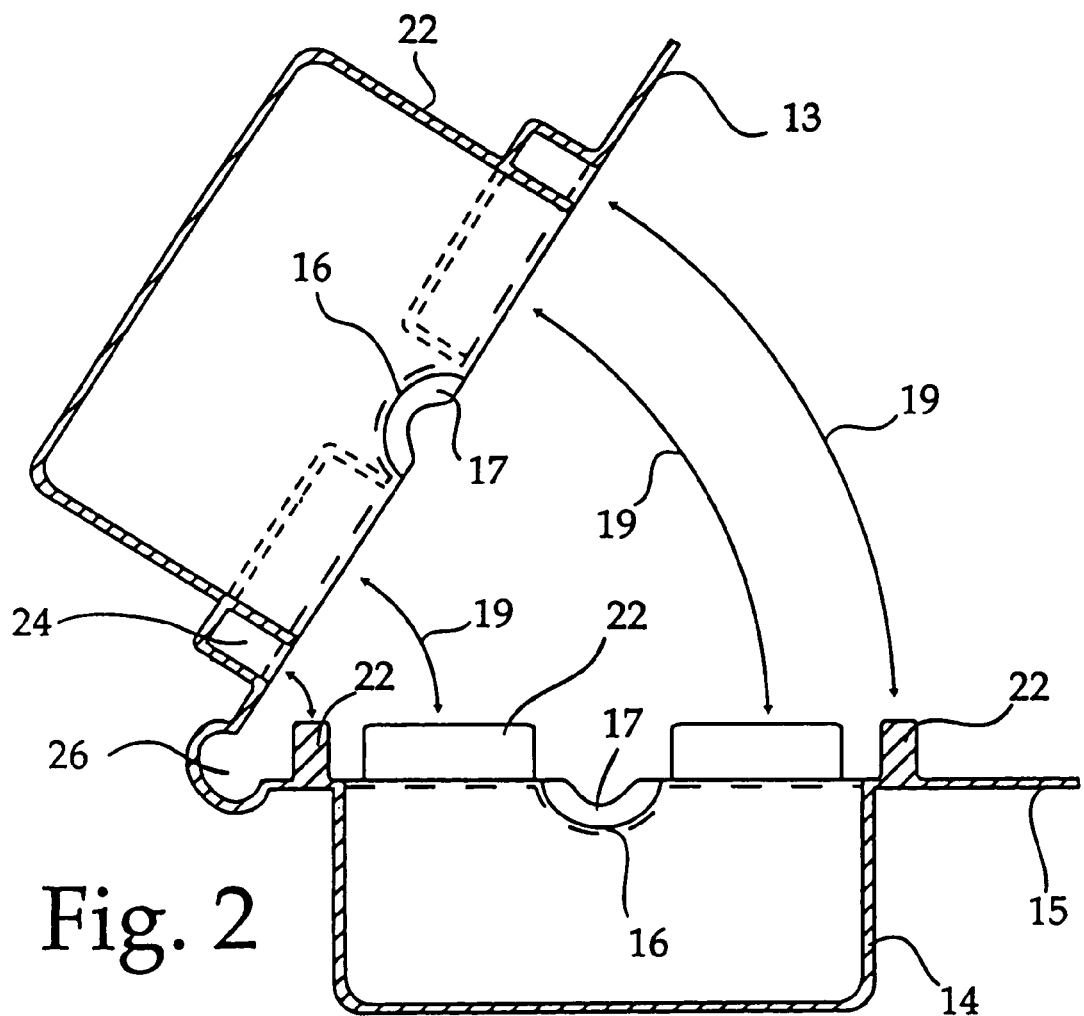
FIG. 2 is a cross-sectional view along section line 2-2 as shown in FIG. 1, showing how one cover half mates with its opposing cover half.

This closing procedure is more clearly shown in FIG. 2 which shows top half 14 being rotated along arrow 19 towards bottom half 12.

Each semi-circular exit opening 16 is fitted with resilient foam 17 which seals against the wires (See FIG. 5) to prevent water from leaking into pockets 18, 20 and causing a short circuit to occur in the outdoor lighting string. The choice of material for resilient foam 17 is not critical as long as it conforms to the wires placed therein to provide a good seal and does not wick any moisture to the inside as would be experienced if an open cell foam were used.

Note that slot and corresponding projection is shown encompassing most of the perimeter of the respective pockets. However, the portion of the perimeter that features this closing mechanism could be substantially less as long as the top shelf 14 is firmly but releasably attached to bottom half 12.

Figure 3:
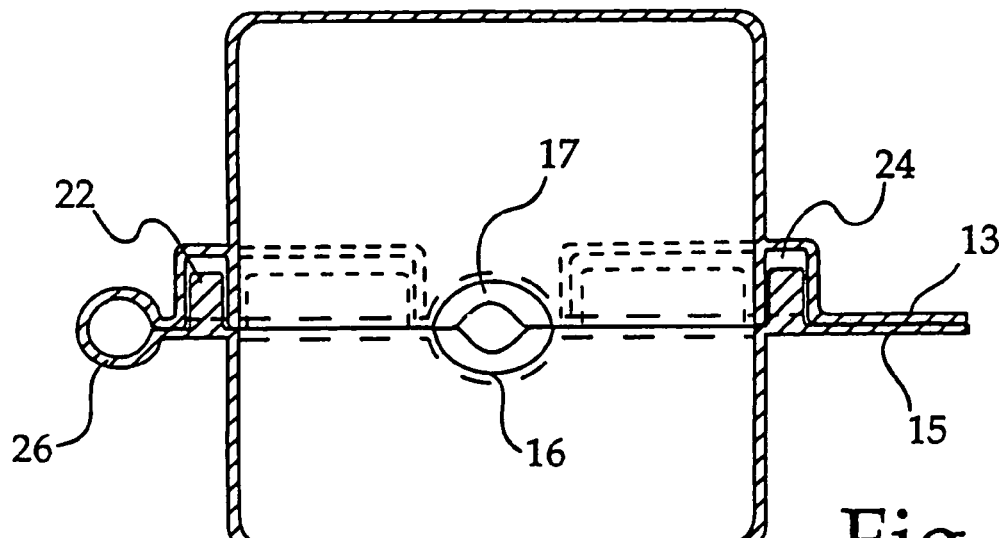
FIG. 3 is another cross-sectional view along section line 2-2, showing the covers snapped together.

FIG. 3 shows invention 10 in the closed position with the U-shaped projections 22 fully engaged in the U-shaped slots 24.

Figure 4:
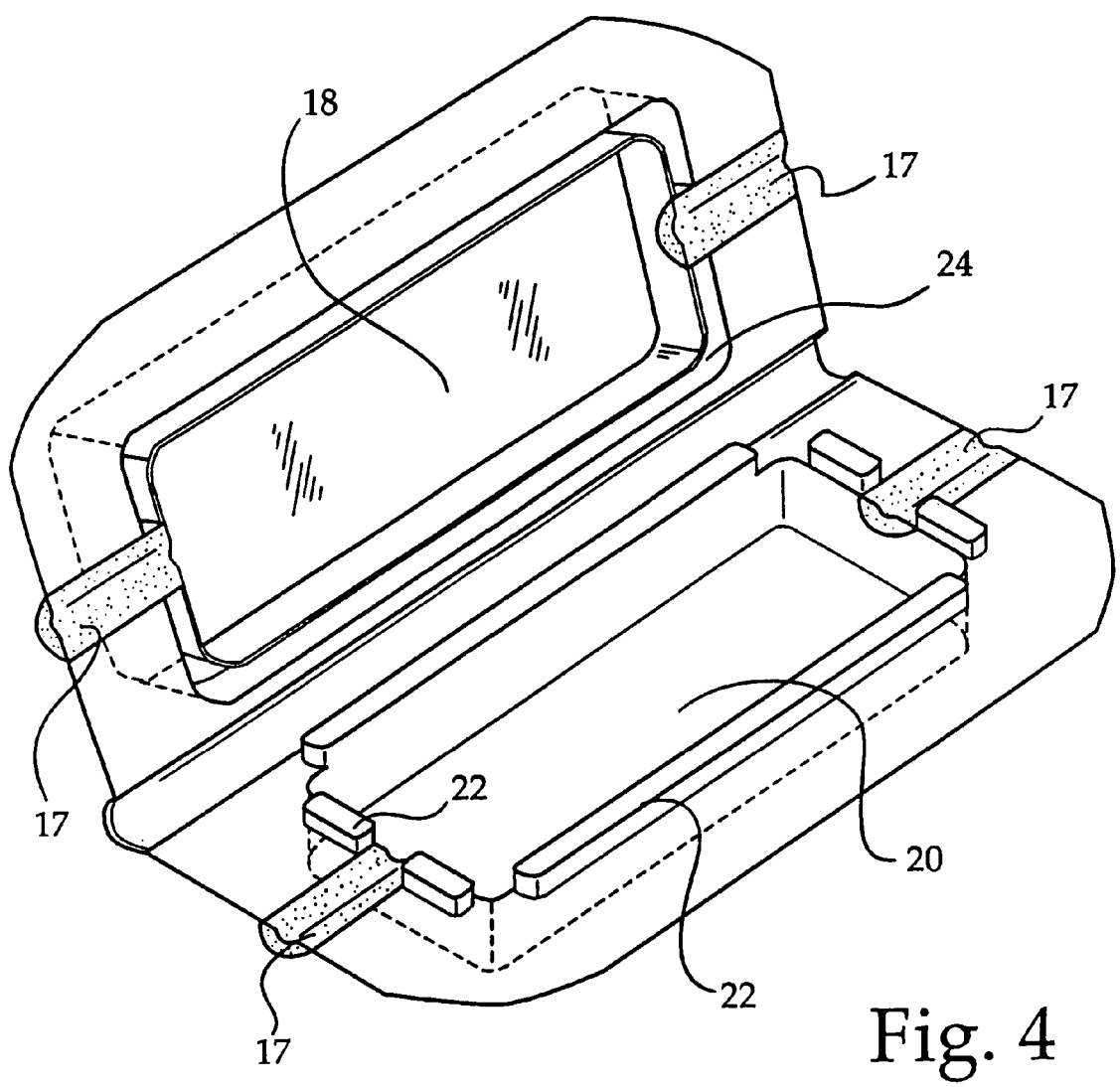
FIG. 4 is an isometric view of the apparatus in the open position.

FIG. 4 is an isometric view of the invention 10 in the open position prior to placing the connected plugs therein.

Figure 5:
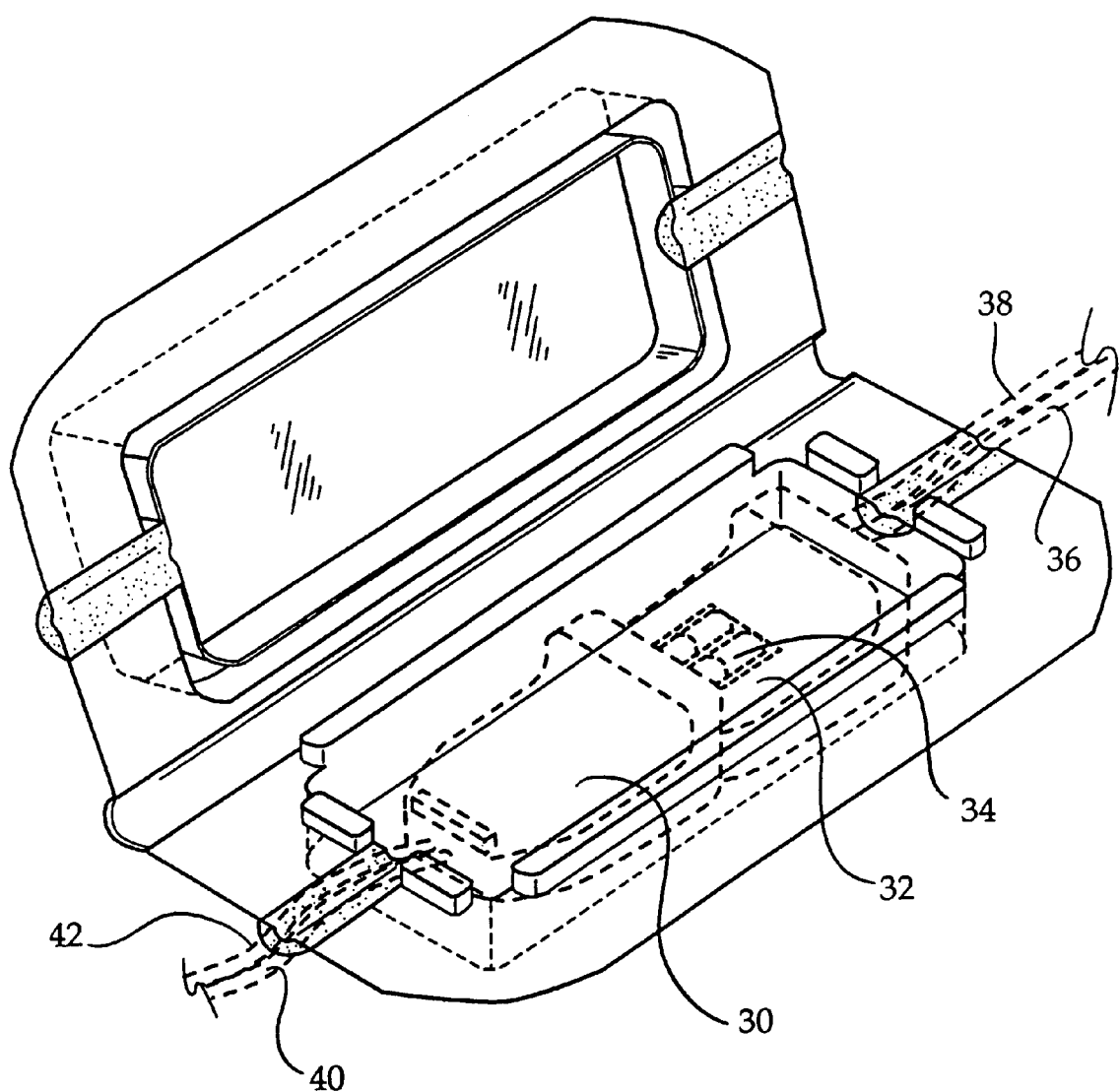
FIG. 5 is an isometric view of the apparatus as shown in FIG. 4, showing the plug of one outdoor light string connected to another one within the apparatus prior to snapping the cover halves together.

FIG. 5 is the same isometric view of the invention 10 with the connected plugs contained prior to snapping the respective halves together. In the two plug variation, each female plug 30 has two wires 40, 42 (typically green) exiting on one end of the invention while male plug 34 also has two wires (again, typically green exiting the other end of the invention. Note that fuse window 34 can be easily viewed when the two halves of invention 10 are snapped together.

Figure 6:
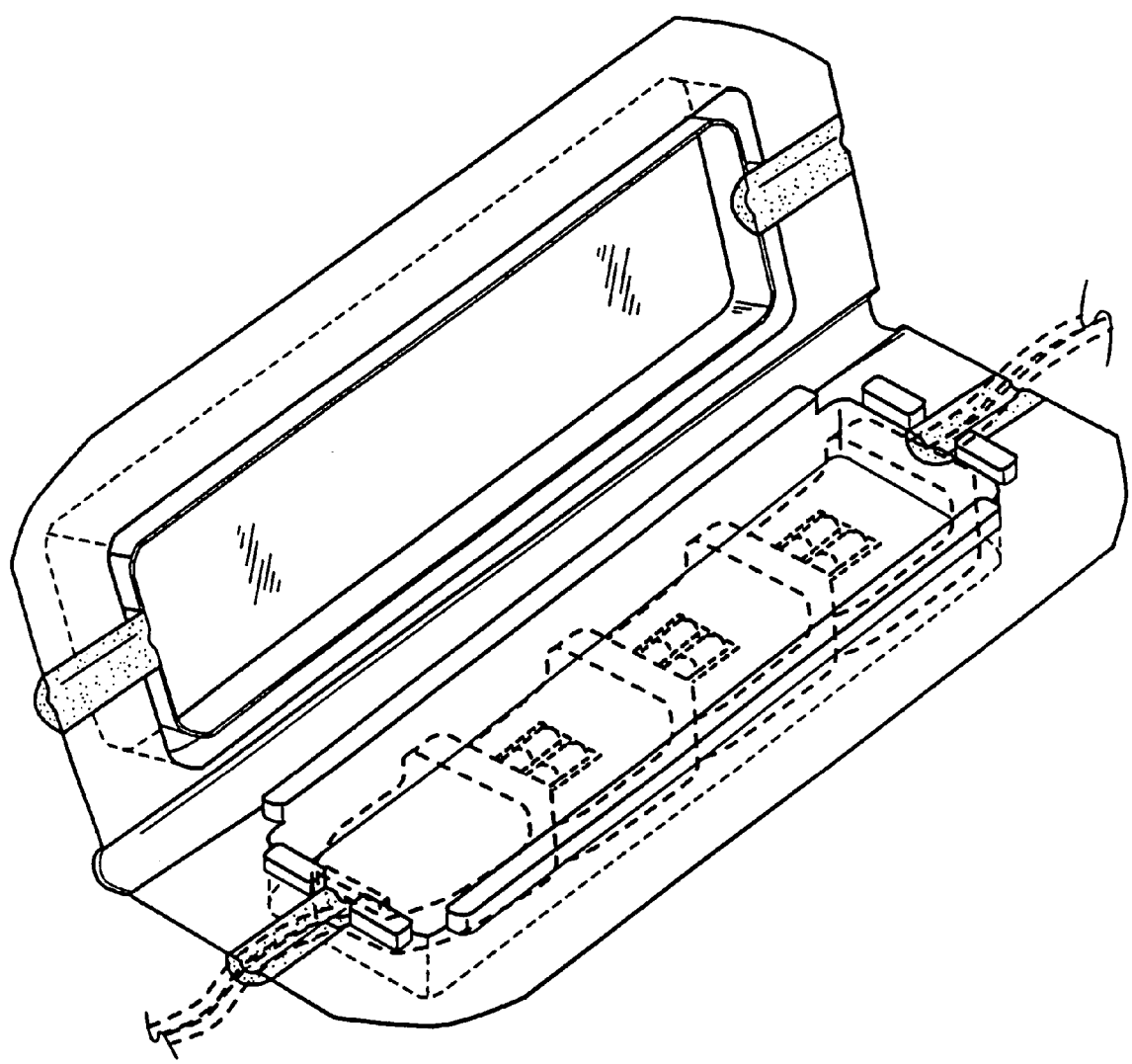
FIG. 6 is an isometric view of an alternative apparatus showing four string plugs connected together.

FIG. 6 is an isometric view of an alternative embodiment of invention 10 where three or four lighting strings can be connected together. This embodiment is substantially identical to the preferred embodiment except that each pocket 18 and 20 are made longer and the respective U-shaped projections and slots are adapted accordingly. In this embodiment, each male plug of the string also has a female receptacle. By inserting the male end of the plug into the female end, up to four strings of lights can be connected. In order to keep the number of wires exiting the invention the same on both ends, the wires from the male plug immediately adjacent to the female plug can be fed through that opening and the wires from the other two male plugs can exit the opening at the other end. Thus, no more than four wires will exit each opening.

In that both the bottom and top halves of the invention are both transparent, it make no difference whether the fuse windows of all plugs are on the same side.

While certain representative embodiments of the invention have been described herein for the purposes of illustration, it will be apparent to those skilled in the art that modification therein may be made without departure from the spirit and scope of the invention.

What is claimed is:

1. An outdoor electrical cord connection protector comprising;
   a pair of mated covers having a length and width such that said covers are hinged along the length of said covers via an integrally-molded hinge of the same thickness as said mated covers; wherein one of said covers has a female lock channel that extends around the perimeter of said cover;
   wherein the other of said covers has a corresponding male lock channel such that folding the two covers together along said hinge locks the male lock channel into the female lock channel,
   such that said hinged covers, when locked together, provides an entrance and exit centered along the width of said covers;
   a seal that can be affixed to said wire entrance and said wire exit; and
   such that said hinged covers also provides a recess adapted to hold at least two mated plugs of an outdoor string of lights, protecting the plugs that are placed in said protector from the external environment.

2. The outdoor electrical cord connection protector of claim 1 wherein said covers are molded from translucent plastic so that a fuse present in one or more of the mated outdoor plugs can be viewed.

3. An outdoor electrical cord connection protector comprising;
   a pair of mated covers having a length and width such that said covers are hinged along the length of said covers via an integrally-molded hinge of the same thickness as said mated covers; wherein one of said covers has a female lock channel that extends around the perimeter of said cover; and
   wherein the other of said covers has a corresponding male lock channel such that folding the two covers together along said hinge locks the male lock channel into the female lock channel,
   such that said hinged covers, when locked together, provides an entrance and exit centered along the width of said covers;
   a seal of resilient foam that can be affixed to said wire entrance and said wire exit; and
   such that said hinged covers also provides a recess adapted to hold at least two mated plugs of an outdoor string of lights, protecting the plugs that are placed in said protector from the external environment.

4. The outdoor electrical cord connection protector of claim 3 wherein said covers are molded from translucent plastic so that a fuse present in one or more of the mated outdoor plugs can be viewed.

* * * * *